NUMBER DISPLAY SYSTEM

Filed Nov. 21, 1966

INVENTORS.
TAKUYA KAWAMOTO
SHUNSUKE SAKODA
BY MITSUHIRO HATTORI

Ward, Haselton, McElhannon, Orme, Brooks & Fitzpatrick
ATTORNEYS

| TIME | | A | B | | | | | C | D |
|---|---|---|---|---|---|---|---|---|---|
| $T_0$ | $t_1$ | | 0 | 0 | 1 | 2 | 3 | | |
| | $t_2$ | 3 | 0 | 0 | 0 | 1 | 2 | | |
| | $t_3$ | 2 | 3 | 0 | 0 | 0 | 1 | | |
| | $t_4$ | 1 | 2 | 3 | 0 | 0 | 0 | | |
| | $t_5$ | 0 | 1 | 2 | 3 | 0 | 0 | | |
| $T_1$ | $t_6$ | 0 | 0 | 1 | 2 | 3 | 0 | | |
| | $t_7$ | 0 | 0 | 0 | 1 | 2 | 3 | | |
| | $t_8$ | 3 | 0 | 0 | 0 | 1 | 2 | | |
| | $t_9$ | 2 | 3 | 0 | 0 | 0 | 1 | | |
| | $t_{10}$ | 1 | 2 | 3 | 0 | 0 | 0 | | |
| $T_2$ | $t_{11}$ | 0 | 1 | 2 | 3 | 0 | 0 | 0 | |
| | $t_{12}$ | 0 | 0 | 1 | 2 | 3 | 0 | | |
| | $t_{13}$ | 0 | 0 | 0 | 1 | 2 | 3 | | SET |
| | $t_{14}$ | 3 | 0 | 0 | 0 | 1 | 2 | | |
| | $t_{15}$ | 2 | 3 | 0 | 0 | 0 | 1 | | |
| $T_3$ | $t_{16}$ | 1 | 2 | 3 | 0 | 0 | 0 | 0 | |
| | $t_{17}$ | 0 | 1 | 2 | 3 | 0 | 0 | | |
| | $t_{18}$ | 0 | 0 | 1 | 2 | 3 | 0 | | |
| | $t_{19}$ | 0 | 0 | 0 | 1 | 2 | 3 | | |
| | $t_{20}$ | 3 | 0 | 0 | 0 | 1 | 2 | | |
| $T_4$ | $t_{21}$ | 2 | 3 | 0 | 0 | 0 | 1 | 1 | |
| | $t_{22}$ | 1 | 2 | 3 | 0 | 0 | 0 | | |
| | $t_{23}$ | 0 | 1 | 2 | 3 | 0 | 0 | | |
| | $t_{24}$ | 0 | 0 | 1 | 2 | 3 | 0 | | |
| | $t_{25}$ | 0 | 0 | 0 | 1 | 2 | 3 | | |
| $T_5$ | $t_{26}$ | 3 | 0 | 0 | 0 | 1 | 2 | 2 | |
| | $t_{27}$ | 2 | 3 | 0 | 0 | 0 | 1 | | |
| | $t_{28}$ | 1 | 2 | 3 | 0 | 0 | 0 | | RESET |
| | $t_{29}$ | 0 | 1 | 2 | 3 | 0 | 0 | | |
| | $t_{30}$ | 0 | 0 | 1 | 2 | 3 | 0 | | |
| $T_6 = T_1$ | $t_{31} = t_1$ | 0 | 0 | 0 | 1 | 2 | 3 | 3 | |
| | $t_2$ | 3 | 0 | 0 | 0 | 1 | 2 | | |
| | $t_3$ | 2 | 3 | 0 | 0 | 0 | 1 | | |
| | $t_4$ | 1 | 2 | 3 | 0 | 0 | 0 | | SET |

NOT DISPLAYED

Fig. 2.

INVENTORS.
TAKUYA KAWAMOTO
SHUNSUKE SAKODA
BY MITSUHIRO HATTORI
Ward, Haselton, McElhannon, Orme, Brooks & Fitzpatrick
ATTORNEYS

United States Patent Office 3,449,726

Patented June 10, 1969

3,449,726

NUMBER DISPLAY SYSTEM

Takuya Kawamoto, Shunsuke Sakoda, and Mitsuhiro Hattori, Tokyo, Japan, assignors to Sony Corporation, Tokyo, Japan, a corporation of Japan Filed Nov. 21, 1966, Ser. No. 595,875
Claims priority, application Japan, Nov. 20, 1965, 40/71,565
Int. Cl. G11b 13/00
U.S. Cl. 340—172.5 3 Claims

ABSTRACT OF THE DISCLOSURE

A number display system having a register for storing a number of digits and a display for displaying such digits transmitted sequentially in ascending order of significance from the register to a buffer during successive time bits each corresponding to a transmitted digit, the buffer stores, for a time interval corresponding to the number of time bits equal to the number of digits, the digit which is transmitted thereto during the time bit at the commencement of each time inerval, whereby the buffer stores the digits sequentially in descending order of significance during a series of the time intervals equal to the number of digits, each digit stored in the buffer for a time interval is transmitted at the conclusion thereof to the display device, the display of the digits thus transmitted to the display device is inhibited at the start of the series of time intervals, as by the output of a suitably set flip-flop circuit, and, upon the detection of a digit other than zero stored in the buffer, the display inhibition is cancelled, as by resetting of the flip-flop circuit, to ensure the display of only effective digits. Further, the display inhibition is cancelled to permit the display of a zero immediately preceding a decimal point.

Figure 1:
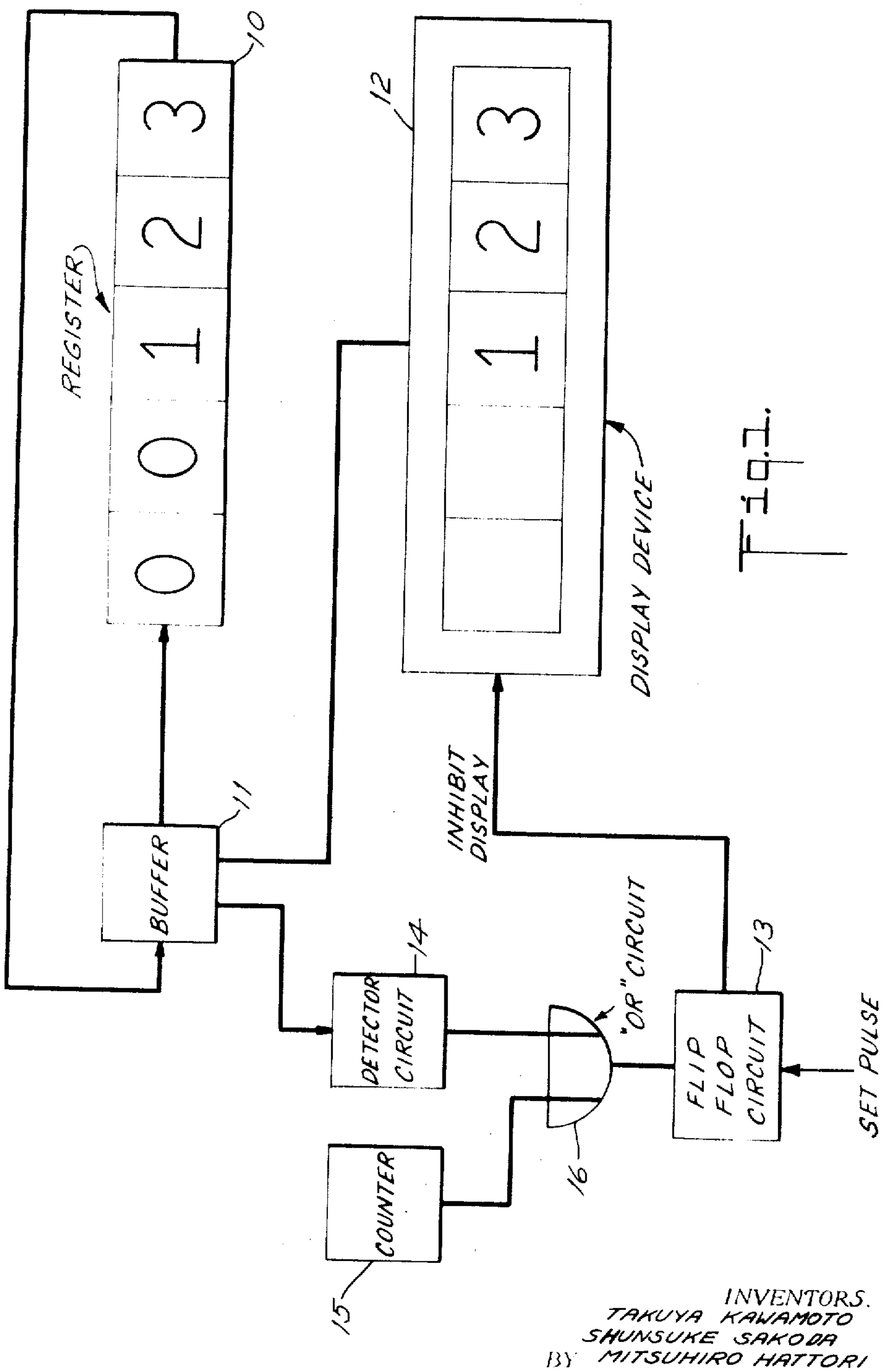

This invention relates generally to a number display system, and more particularly to a number display system for use with computers and particularly to the use of such a system which is particularly adapted to avoid display of any futile or insignificant numbers.

This invention is particularly applicable to computers of the type in which the result of a calculation or the output of the computer is displayed as a series of numbers or digits by the use of indicator tubes such as those commercially sold under the designation "Nixie Tube." In prior art computers of this type, the indicator tubes are adapted to display zero except when they are displaying an effective number. Due to this fact, the display is difficult to see distinctly and difficult to interpret due to the display of futile or meaningless numbers.

In most prior art computers the display device is adapted to display a number containing five units or digits. In order to display a number containing three units, such for example as "123" the number is conventionally displayed on prior art computers as "00123." This is confusing, however, and it is therefore preferred to eliminate the two zeros, which in essence are futile or useless numbers. The usual way of displaying the content of a register on display tubes is to sequentially feed the content of the register to a buffer in the ascending order of significance, that is, commencing with the least significant digit.

In the case where the content of the register is, for example, "40123" a significant and meaningful zero is present next to the 4 so that even if the content fed to the buffer after the numeral 1 is zero, the zero can still not be removed since it is a significant number. It is, therefore, essential to know in advance that an effective number is present before a zero in order to prevent the zero from being removed. In order to perform this, however, the construction of prior art display devices becomes complicated. This is paticularly true in the case where it is desired to display a number such as "0.123."

In view of the foregoing, the primary object of the present invention is to provide a number display system for use with computers in which the number display system is provided with a circuit which generates a signal that prevents the display of futile numbers.

Another object of the present invention is to provide a number display system for use with computers which eliminates the display of futile and insignificant numbers.

A further object of the present invention is to provide a number display system for use with computers, which will display a zero only when the zero appears ahead of a decimal point and which will not display any other futile numbers.

These and further objects, features and advantages of the present invention will appear from a reading of the following detailed description of a preferred embodiment of the present invention, which is to be read in conjunction with the accompanying drawings.

In the drawings:

FIG. 1 is a block diagram illustrating one example of a serial display system for use with computers in accordance with the present invention; and FIG. 2 is a table which illustrates a system depicted in FIG. 1.

This invention is particularly directed to computers utilizing a serial display system in which the output of the computer register is in the form of a signal for each unit or bit of time, and in which the system is so designed that the figures stored in the register are shifted to the right to sequentially apply the digits stored in the register to a buffer in the ascending order of significance, i.e., from the least significant digit to the most significant digit.

In the present invention the content of the register is shifted to the right. In this manner, the content of the register is fed to a buffer in the ascending order of significance, but in accordance with the invention such content is sequentially stored in the buffer and sequentially fed from the buffer to the display device in the descending order of significance so that the structure for displaying the effective numbers is simplified. The avoidance of the display of ineffective zeroes is accomplished in the present invention by detecting whether the content stored in the buffer is zero or whether there is a decimal point in the number to be displayed.

Referring now to FIG. 1, the register is identified by the numeral 10, the buffer by the numeral 11 and the display device by the numeral 12. As illustrated in FIG. 1 the register 10 is of the type that can accommodate five figures or digits. When the content of the register 10 is a number such as "123" the register 10 has a content of 0–0–1–2–3 at the reference time $t_1$. After each unit or bit of time $t_1$, $t_2$, $t_3$, $t_4$, etc., the numbers in the register 10 and in the buffer 11 are shifted by exchange therebetween, as illustrated in the table of FIG. 2. As can be seen from FIG. 2 the contents of the register 10 are sequentially shifted to the buffer 11 commencing with the lower or least significant figure "3." The numerals 0–0–1–2–3, that is, the content of register 10 in the descending order of significance, are respectively stored in the buffer 11 at the times $t_6$, $t_{11}$, $t_{16}$, $t_{21}$ and $t_{26}$ which represent digit storage times generally identified at $T_1$, and which occur at five-bit intervals. In FIG. 2 the first column represents the digit storage times $T_1$, with the time $t_6$ being referred to as $T_1$, $t_{11}$ being referred to as $T_2$, $t_{16}$ being referred to as $T_3$, $t_{21}$ being referred to as $T_4$, and $t_{26}$ being referred to as $T_5$. The column labeled A represents the numbers applied to the buffer 11 with those stored in the buffer 11 for the next five-bit interval being enclosed in a heavy or dark margin, the column labeled B represents the numbers stored in the register 10, the column labeled C represents the number transmitted to the display device 12 and the column labeled D represents the condition of the flip-flop circuit 13.

As illustrated in FIG. 2 the time $T_6$ again commences the cycle and this time is therefore referred to as $T_1$. At the times $T_2$, $T_3$, $T_4$, $T_5$ and $T_1$ the numbers stored in the buffer 11 are fed to the display device 12. In other words, the number stored in buffer 11 at each digit storage time $T_1$ is fed to display device 12 upon the next occurring digit storage time. In a manner to be hereafter described, however, the first two digits, which are zeros, and are futile or ineffective numbers are not displayed.

The content of the buffer 11 at each time $T_1$ is applied to a detector circuit 14 which detects whether the content of the buffer 11 at that particular time is "0." If the content of the buffer 11 at a time $T_1$ is not "0," the output of the detector circuit 14 is applied during the next bit time, that is, at $T_1+1$ to the reset terminal of a multistable or flip-flop circuit 13 to reset the same. At the time interval $t_{17}$ for example, which is one bit time after the time $T_3$ (or $t_{16}$), the output of the detector circuit 14 resets the multi-stable circuit 13 since the content of the buffer 11 at the time $T_3$ is not "0" but "1."

A set pulse is fed to the set terminal of the multistable circuit 13 from a source (not shown) at the times $t_7$ and $t_2$ after $T_6$, as shown on FIG. 2. These times coincide with a one bit delayed time interval after each time $T_1$. As a result of this, the output of the multi-stable or flip-flop circuit 13 is present at the times $t_7$ through $t_{17}$ and, therefore, the output of the multi-stable circuit 13 during these times is applied as an inhibit signal to the display device 12 so that the display by the display device of the digit "0" fed thereto from buffer 11 at the times $T_2$ and $T_3$ is prevented. As a result of this operation, the display appearing on the display 12 is "123" since the first two futile numbers, or "00," has been eliminated.

The foregoing explanation has been given with reference to the display of number such as "123." In the case, however, where it is desired to display a number such as "1023" it is necessary that the effective "0" between "1" and "2" be displayed. This would occur since a set pulse would be fed to the set terminal of the multi-stable circuit 13 only at the time $T_1+1$ to prevent the display of a futile "0."

Another set of digits which it may be desired to display is one involving a decimal point, such as "0.123." In a case such as that, a counter circuit 15 is provided which memorizes that a decimal point is present between the second and third places from the left of the register 10. The content of this counter 15 is subtracted or reduced at every time interval $T_1$ from the time $T_1$ and when the content has been reduced to zero, pulse is fed from counter 15 in the next time bit to the multi-stable circuit 13. In the case given, for example, the content of the counter 15 varies from a state memorizing "2" at the time $T_1$ to a state that has been reduced to "0" at the time $T_2$. Through the use of the pulse obtained at the time $T_2$, the multi-stable circuit 13 is reset at the time $t_{12}$ following the time $T_2$ with the result that the "0" appearing ahead of the decimal point remains while any other futile "0" can be eliminated. Therefore, as illustrated in FIG. 1, the output of the detector 14 and the output of the counter 15 are applied to the multi-stable circuit 13 through the "OR" circuit, identified in general by the numeral 16.

It will be understood that although one preferred embodiment of the invention has been illustrated and described that many modifications and variations may be effected thereto without departing from the scope of the novel concepts of this invention as set forth in the appended claims.

We claim:

1. A number display system, comprising a register for storing a plurality of digits, a buffer, a display device for sequentially displaying digits transmitted thereto by said buffer, transfer means for sequentially transmitting to said buffer from said register the digits stored in said reigister in ascending order of significance during successive time bits each corresponding to a transmitted digit, said buffer storing, for a time interval corresponding to the number of said time bits equal to the number of said time bits equal to the number of said digits in said register, the digit which is transmitted to said buffer during the time bit commencing each said time interval, whereby said buffer sequentially stores said digits in descending order of significance during a series of said time intervals equal in number to said number of digits, means for transmitting to said display device at the conclusion of each said time interval the digit which has been stored in said buffer, display inhibiting means made operative during the first of the time intervals of said series to inhibit the display by said display device of digits transmitted thereto from said buffer, and detector means detecting whether the digit stored in said buffer during each said time interval is a digit other than zero and, upon the detection of a stored digit other than zero, rendering inoperative said display inhibiting means to ensure the display by said display device of only effective digits.

2. A number display system according to claim 1, in which said display inhibiting means is a flip-flop circuit receiving a set pulse during said first time interval of the series to provide an output signal to said display device which inhibits the display by the latter of digits thereafter transmitted thereto from said buffer, and said detector means is operative, upon said detection of a stored digit other than zero, to supply a reset pulse to said flip-flop circuit for cancelling said output signal from the latter.

3. A number display system according to claim 1, further comprising means to detect the presence of a decimal point at a position between any two of said digits stored by said register and being effective to render inoperative said display inhibiting means upon the storage in said buffer of the one of said two digits which is of an order higher than said position of the decimal point, whereby to ensure the display by said display device of said one digit even when the latter is zero.

References Cited

UNITED STATES PATENTS

| | | | |
|---|---|---|---|
| 3,045,211 | 7/1962 | Auerbach | 340—172.5 |
| 3,156,815 | 11/1964 | Smeltzer | 340—172.5 |
| 3,271,745 | 9/1966 | Schauer | 340—172.5 |
| 3,375,498 | 3/1968 | Scuitto et al. | 340—172.5 |
| 3,286,237 | 11/1966 | Kikuchi | 340—172.5 |
| 3,388,384 | 6/1968 | Bogert et al. | 340—172.5 |

ROBERT C. BAILEY, *Primary Examiner.*

JOHN P. VANDERBURG, *Assistant Examiner.*

U.S. Cl. X.R.

340—324, 366